United States Patent Office 3,836,607
Patented Sept. 17, 1974

3,836,607
THERMOPLASTIC MOLDING COMPOSITION COMPRISING POLYBUTENE AND POLYPROPYLENE
Hans-Ulrich Finkmann and Bernhard Engeln, Marl, Germany, assignors to Chemische Werke Huls Aktiengesellschaft, Marl, Germany
No Drawing. Filed July 28, 1972, Ser. No. 275,906
Claims priority, application Germany, Aug. 3, 1971,
P 21 38 685.6
Int. Cl. C08f 29/12
U.S. Cl. 260—897 A
3 Claims

ABSTRACT OF THE DISCLOSURE

Thermoplastic molding compositions for producing dimensionally stable and impact resistant shaped articles from a mixture of poly-1-butene and polypropylene, wherein 60–85 percent by weight of the composition is predominantly isotactic low pressure poly-1-butene having up to 5 mole percent of ethylene as a copolymer, a molecular weight of about 1,000,000 to 2,400,000 and a density of about 0.910 to 0.920 grams per cubic centimeter, and about 15–40 percent by weight of the composition is predominantly isotactic polypropylene produced in the gaseous phase having a molecular weight of about 1,000,000 to 1,600,000 and a density of about 0.890 to 0.896 grams per cubic centimeter.

CROSS REFERENCES TO RELATED APPLICATIONS

Applicants claim priority under 35 U.S.C. 119 for Application P 21 38 685.6 filed Aug. 3, 1971 in the Patent Office of the Federal Republic of Germany. Applicants incorporate by reference Application Serial No. 203,060 of Beckmann et al., filed Nov. 29, 1971, now U.S. Pat. 3,749,555. The Beckmann et al. application and U.S. Pat. 3,640,919 referred to therein disclose the state of the art of polymerizing poly-1-butene.

BACKGROUND OF THE INVENTION

The field of the invention is mixed synthetic resins from polymerized ethylenically unsaturated compounds.

The invention is particularly concerned with a thermoplastic molding composition of isotactic poly-1-butene and isotactic polypropylene.

Mixtures of 5–40 percent by weight of isotactic poly-1-butene and 95–60 percent by weight of isotactic polypropylene are disclosed in Canadian Patent 633,823. The purpose of adding the poly-1-butene is to impart to the polypropylene the lower brittle point and the improved utility properties of poly-1-butene at lower temperatures. Furthermore, the Canadian patent discloses mixtures of 5–40 percent by weight of isotactic polypropylene and 95–60 percent by weight of isotactic poly-1- butene wherein the poly-1-butene is modified by the higher bending strength and the improved elasticity behavior of polypropylene.

It is known from the Journal of Polymer Science, Vol. 62, pp. 870–871 (1962) to add to the isotactic poly-1-butene 2–5 percent by weight of polypropylene in order to accelerate the conversion of the unstable tetragonal modification 2 produced from the melt into the stable rhombohedral modification 1. Additives on this order of magnitude hardly affect the mechanical properties of poly-1-butene.

German Unexamined Published Application 1,669,851 discloses that the dimensional stability of shaped articles of polybutene can be improved by the addition of 20, 30, or 40 percent by weight of polypropylene. Although shaped articles from such mixtures are similar to polypropylene with respect to dimensional stability, they are brittle and susceptible to breaking after the modification conversion. Only those mixtures containing 45–75 percent by weight of polypropylene or in addition another rubber-type component produce shaped articles which are not brittle and subject to breakage.

These prior art mixtures all contain polypropylenes of relatively low molecular weights which are obtained in the usual manner according to Ziegler-Natta.

Therefore, it was found that the heretofore described prior art mixtures of poly-1-butene and polypropylene, have limitations even though they yield shaped articles of good dimensional stability, they produce articles of insufficient impact strength.

SUMMARY OF THE INVENTION

Having in mind the limitations of the prior art, it is an object of this invention to provide mixtures based on poly-1-butene which, by the addition of polypropylene, result not only in dimensionally stable but also impact resistant shaped articles. In contrast to the disclosure of the Canadian patent, no change in the elasticity behavior is desired, since both starting substances have the same modulus of elasticity.

According to the invention, these objects are attained by providing that the mixtures contain 60–85 percent by weight of predominantly isotactic low pressure poly-1-butene which can contain up to 5 mole percent of ethylene as the copolymer, with a molecular weight of $\bar{M}_w$ of 1,000,000 to 2,400,000 and a density of 0.910 to 0.920 g./cm.$^3$; and 15–40 percent by weight of predominantly isotatic polypropylene having a molecular weight $\bar{M}_w$ of 750,000 to 2,000,000 and a density of 0.890 to 0.896 g./cm.$^3$.

As a suitable predominantly isotactic poly-1-butene, it is possible to employ the homo- and/or copolymers thereof with up to 5 mole percent of ethylene and a molecular weight of 1,000,000 to 2,400,000, preferably 1,500,000 to 2,000,000.

The predominantly isotactic poly-1-butene is obtained preferably by means of low pressure polymerization of 1-butene, optionally in the presence of low proportions of ethylene, in the liquid phase in the presence of stereospecifically effective Ziegler/Natta catalysts, for example Al($C_2H_5$)$_2$ and (3TiCl$_3$·AlCl$_3$). In this process, the molecular weight can be regulated by various measures, for example by temperature elevation or by the addition of inert gases, such as hydrogen, to the polymerization charge, whereby the molecular weight is lowered. Such a poly-1-butene is disclosed in German Patent Publications 1,094,985, 1,257,430, 1,302,122, 1,096,607, and 1,420,557.

For the mixture, a polypropylene is suitable having a molecular weight of 750,000 to 2,000,000, preferably 1,000,000 to 1,600,000.

Such a polypropylene can be obtained by polymerizing propylene in a conventional manner, for example according to Ziegler-Natta, in the presence of inert diluents, e.g. hydrocarbons, on mixed catalysts of titanium compounds, such as titanium trichloride, on the one hand, and aluminum compounds, such as halogen-containing alkylaluminum compound, on the other hand, wherein the molecular weight is likewise adjustable by temperature control or by the use of an inert gas.

A particularly well suited polypropylene is that which is obtained by catalytic polymerization in the gaseous phase without the concomitant use of an auxiliary medium. The reaction medium in this case is the high molecular polymer itself. Such a polypropylene is disclosed in German Patent Publication 1,217,071.

These polypropylenes obtained in different ways approximately correspond to one another with respect to density, melting range, transparency, stretchability of films, resistance to crack formation under tension, and low temperature impact resistance. In contrast thereto, the gas-phase polymer corresponds, with respect to hardness and rigidity, approximately to a high pressure polyethylene of the density of 0.930 to 0.950 g./cm.³ and exhibits an increased impact strength and toughness.

The $\eta_{red}$ values indicated for the molecular weights have been measured at 135° C. in "Decalin" (decahydronaphthalene).

When stereospecifically active catalysts are selected, the two starting substances are obtained practically completely, or at least predominantly, in the isotactic form.

By predominantly isotactic is meant insoluble in refluxing heptane. At least 90 weight percent of the polymer will be insoluble in refluxing heptane and preferably more than 95 weight percent of the polymer will be insoluble in refluxing heptane. In determining the solubility, 10 parts of heptane are used per part of polymer.

Mixtures of about 60–85 percent by weight of predominantly isotactic poly-1-butene, preferably about 70–80 percent by weight, on the one hand, and about 15–40 percent by weight of predominantly isotactic polypropylene, preferably about 20–30 percent by weight, on the other hand, are useful.

The mixtures can be produced starting with a powder as well as with granules. For example, the mixing step is conducted in a high speed mixer having a capacity of 150 liters for 10 minutes at room temperature. Thereafter, the final homogenization and production of the granulated material are conducted in a twin-screw extruder. The temperature adjustment in the extruder, from the inlet to the die, is suitably about 190/230/230° and 230° C.

EXAMPLES

The processing operation is conducted in an injection molding machine with screw plasticization and a rectangular box mold having a length of 205 mm., a width of 105 mm., a depth of 80 mm., and a wall thickness of 2.5 mm., with a point-shaped 2.5 mm. sprue.

Processing conditions

Cylinder temperatures _____ 230/230/240/240° C. inlet to die.
Mold temperature _____ Cooled to 20° C.
Injection pressure _____ 800 atmospheres.
Back pressure _____ 600 atmospheres.
Ram pressure _____ 50 atmospheres.
Injection time _____ 3 seconds.
Back pressure time _____ 15 seconds.
Cooling time _____ 45 seconds.

The finished molded articles are exposed, after a storage time of 14 days at room temperature, to a falling weight test. In this test, the molded articles (boxes) are disposed underneath a guide pipe through which a cylindrical, conically tapering weight of 6 kg. (diameter 100 mm.) falls from heights of 0.5 to 2.0 m. on the bottom surface of the boxes, the open ends of which point downwardly and which are disposed on a steel plate. The temperature during this test is about 20° C.

Comparative Example 1

Poly-1-butene: molecular weight $\overline{M}_w$=1,500,000
Falling weight test: height 0.50 m. Result: breakage.

Comparative Example 2

Poly-1-butene: molecular weight $\overline{M}_w$=2,400,000
Falling weight test: height 0.50 m. Result: breakage.

Comparative Example 3

Polypropylene (Ziegler-Natta): molecular weight $\overline{M}_w$=470,000
Falling weight test: height 0.50 m. Result: breakage.

Comparative Example 4

90% poly-1-butene: molecular weight $\overline{M}_w$=1,500,000
10% polypropylene (Ziegler-Natta): molecular weight $\overline{M}_w$=215,000
Falling weight test: height 0.50 m. Result: breakage.

Comparative Example 5

90% poly-1-butene: molecular weight $\overline{M}_w$=1,200,000
10% polypropylene (Ziegler-Natta): molecular weight $\overline{M}_w$=600,000
Falling weight test: height 0.50 m. Result: breakage.

Comparative Example 6

80% poly-1-butene: molecular weight $\overline{M}_w$=1,500,000
20% polypropylene (Ziegler-Natta): molecular weight $\overline{M}_w$=470,000
Falling weight test: height 0.50 m. Result: breakage.

Comparative Example 7

70% poly-1-butene: molecular weight $\overline{M}_w$=2,400,000
30% polypropylene (Ziegler-Natta): molecular weight $\overline{M}_w$=600,000
Falling weight test: height 0.50 m. Result: breakage.

Comparative Example 8

60% poly-1-butene: molecular weight $\overline{M}_w$=1,800,000
40% polypropylene (Ziegler-Natta): molecular weight $\overline{M}_w$=500,000
Falling weight test: height 0.50 m. Result: breakage.

Example 9

90% poly-1-butene: molecular weight $\overline{M}_W$=1,600,000
10% polypropylene (produced in the gaseous phase): Molecular weight $\overline{M}_W$=1,600,000
Falling weight test:
 Height 1.00 m. Result: no breakage.
 Height 1.50 m. Result: breakage.

Example 10

90% poly-1-butene:
 molecular weight $\overline{M}_W$=1,200,000
10% polypropylene (produced in the gaseous phase):
 molecular weight $\overline{M}_W$=1,100,000
Falling weight test:
 Height 0.50 m. Result: no breakage.
 Height 1.00 m. Result: breakage.

Example 11

80% poly-1-butene:
 molecular weight $\overline{M}_W$=1,600,000
20% polypropylene (produced in the gaseous phase):
 molecular weight $\overline{M}_W$=1,600,000
Falling weight test: height 2.00 m. Result: no breakage.

The same result is obtained by using a butene copolymer having a content of 4 percent of ethylene of the same molecular weight, under otherwise identical conditions.

If, in place of the above-indicated polypropylene, a polypropylene is used having a molecular weight of $\overline{M}_W$=2,000,000, still no breakage occurs above a falling weight test height of 2.00 m.

Example 12

70% poly-1-butene:
 molecular weight $\overline{M}_W$=2,000,000
30% polypropylene (produced in the gaseous phase):
 molecular weight $\overline{M}_W$=1,600,000
Falling weight test: height 2.00 m. Result: no breakage.

By the use of a poly-1-butene of a molecular weight $\overline{M}_W$=2,400,000 in place of the above indicated poly-1-butene, still no breakage occurs above a falling weight test height of 2.00 m.

Example 13

60% poly-1-butene:
  molecular weight $\overline{M}_W = 1,500,000$
40% polypropylene (produced in the gaseous phase):
  molecular weight $\overline{M}_W = 1,600,000$
Falling weight test: height 2.00 m. Result: no breakage.

By the use of a poly-1-butene having a molecular weight of $\overline{M}_W = 1,100,000$ in place of the above-disclosed poly-1-butene, no breakage occurs at a falling weight test height of 1.00 m.

In Examples 4 through 8, mixtures are set forth of poly-1-butene with low molecular polypropylene prepared in accordance with Ziegler-Natta as disclosed in German Patent Publication 1,302,122. All molded articles from these mixtures failed at a falling weight test height of 0.50 m. Examples 9 through 13 demonstrate the results of mixtures of poly-1-butene and high molecular polypropylene produced in the gaseous phase as disclosed in German Patent Publication 1,217,071. Molded articles from these mixtures show no breakage with corresponding mixture proportions and a falling weight test height of above 0.50 m. Furthermore, no brittleness can be detected.

The processing of such mixtures can be executed without difficulties in injection molding as well as extrusion operations. By means of the extrusion method, it is possible to produce pipes, sheets, hollow bodies, films, and any desired profiled sections, whereas the injection molding procedure yields technical articles and utility articles of all kinds. Both processes benefit from the rapid modification conversion after processing, whereby the parts produced are obtained in a dimensionally stable condition.

We claim:

1. In a thermoplastic molding composition comprising a mixture of poly-1-butene and polypropylene, the improvement comprising the preparation of dimensionally stable and impact resistant shaped articles from a composition comprising about 60 to 85 percent by weight of a predominantly isotactic low pressure 1-butene polymer selected from the group consisting of poly-1-butene and a copolymer of poly-1-butene and up to 5 mole percent of ethylene having a molecular weight $\overline{M}_W$ of about 1,000,000 to 2,400,000 and a density of about 0.910 to 0.920 grams per cubic centimeter and about 15 to 40 percent by weight of a predominantly isotactic polypropylene produced by catalytic polymerization in the gaseous phase without the presence of an auxiliary medium having a molecular weight $\overline{M}_W$ of about 1,000,000 to 1,600,000 and a density of about 0.890 to 0.896 grams per cubic centimeter.

2. The thermoplastic molding composition of Claim 1, wherein the molecular weight $\overline{M}_W$ of said 1-butene polymer is about 1,500,000 to 2,000,000.

3. The thermoplastic molding composition of Claim 2, wherein said 1-butene polymer is about 70 to 80 percent by weight and said polypropylene is about 20 to 30 percent by weight.

References Cited

UNITED STATES PATENTS

| | | | |
|---|---|---|---|
| 3,634,552 | 1/1972 | Foglia et al. | 260—897 A |
| 2,356,765 | 12/1967 | Musso et al. | 260—897 |
| 3,372,049 | 3/1968 | Schaffhausen | 117—7 |

FOREIGN PATENTS

| | | | |
|---|---|---|---|
| 835,330 | 5/1960 | Great Britain | 260—897 |

OTHER REFERENCES

Boenig, Polyolefins (textbook), 1966, p. 133.

MURRAY TILLMAN, Primary Examiner

C. J. SECCURO, Assistant Examiner

U.S. Cl. X.R.

260—93.7